3,706,611
METHOD OF MAKING PYROTECHNIC COMPOSITION CONTAINING A POLYSULPHIDE POLYMER

Garth W. Hastings, Caringbah, New South Wales, Australia, assignor to The Secretary of State for Defense in Her Britannic Majesty's Government of the United Kingdom of Great Britain and Northern Ireland, London, England
No Drawing. Filed Aug. 26, 1965, Ser. No. 482,945
Int. Cl. C06b 15/00
U.S. Cl. 149—44      5 Claims

ABSTRACT OF THE DISCLOSURE

The present invention relates to pyrotechnic compositions, that is to say, light-producing and/or igniferous compositions whch contain considerable proportions of light-producing and/or igniferous metallic powders, such as powdered magnesium, aluminium or magnesium-aluminium alloys.

---

The invention aims at producing a pyrotechnic composition which has good physical properties, in particular, good storage properties, ease of handling during manufacture and resistance to mechanical damage.

Compositions of a plastic or rubbery nature have these desired properties but hitherto it has been found difficult to manufacture satisfactory plastic or rubbery pyrotechnic compositions owing to the difficulty of producing a coherent mass probably due to the large proportion of non-binding constituents to be blended during the mixing operation.

In particular, rubbery compositions which are prepared using a polymerisable liquid co-binder would appear to be difficult to fabricate as partial curing to a rubber would take place during a long mixing process.

We have now discovered an improved method of manufacture by which satisfactory rubbery or elastic pyrotechnic compositions may be produced.

In accordance with the invention a rubbery pyrotechnic composition may be made by mixing together a polysulphide liquid polymer and an appropriate rubber-forming agent, a light-producing and/or igniferous metallic powder, oxidising agents and if desired other constituents, the proportion of metallic powder being at least 30% by weight, and the mixing process being carried out under considerably reduced pressure and at an elevated temperature above the normal curing temperature of the polysulphide binder; the normal curing temperature being that at which curing takes place in 12–24 hours. We have discovered that although the polysulphide rubber binder is being rapidly cured while being mixed at the elevated temperature, the stiffening effect due to partial curing is sufficintly counterbalanced by the reduction in the viscosity of the liquid at the elevated temperature to enable adequate mixing to take place in a relatively short time, while stirring under low pressure de-gasses and de-hydrates the composition, with the overall result that a satisfactory adequately mixed coherent mass can be produced.

The mixing process is preferably carried out at a very low pressure and at a temperature of the order of 100° C. at which temperature curing takes place in about 2–3 hours. The mixing preferably proceeds for half to one hour at about 100° C. after the rubber-forming agents have been added to the mixture.

Rubbery flare compositions which may be made by the process generally have compositions within the following limits:

| | Percent |
|---|---|
| Polysulphide binder | 8–25 |
| Metal powder | 30–60 |
| Oxidising agent | 25–50 |

Additives, up to 20.

A suitable polysulphide liquid polymer preferably has a relatively low molecular weight (between 500 and 10,000), and may be, for example, a Thiokol liquid polymer No. LP2, LP32 or LP33. The rubber-forming agent may be lead peroxide, or a mixture of carbon black, p-quinone dioxime and diphenyl guanidine or other appropriate agents.

Suitable oxidising agents are alkali metal and alkaline earth metal nitrates and perchlorates, in particular, potassium perchlorate.

The following green, red and yellow coloured flare compositions are given by way of example:

| | Green | Red | Yellow |
|---|---|---|---|
| Thiokol LP2 | 18 | 16 | 14 |
| Magnesium | 35 | 41 | 57.3 |
| Potassium perchlorate | 11 | 21.5 | |
| Barium nitrate | 32 | | |
| Strontium nitrate | | 21.5 | |
| Sodium nitrate | | | 28.7 |
| Boron | 4 | | |

A typical manufacturing process is as follows: The mixing operation is carried out in a stainless steel pot having an integral heat exchange jacket and a bottom exit, closed during mixing by a plug held in position by a screw jack device. The pot is equipped with a multi-bladed stirrer having a vertical shaft bearing inclined blades or a spirally wound steel strip so that material in the pot may be either lifted or forced down (and extruded through the bottom when desired) in accordance with the direction of rotation of the shaft.

A hopper incorporating an Archimedean screw and a vibrator is used to effect slow, even addition of solids to the mix. A slow, continuous addition of solids to the mixes enables equilibrium conditions to be attained much more rapidly and more fluid mixes to be obtained. The more fluid mixes may be extruded through the bottom exit of the pot by a piston after removal of the stirrer.

The pot is maintained at 100° C. throughout the mixing process. A "Thiokol" liquid is placed in the pot and stirred for 30 minutes under vacuum. Magnesium powder is then slowly added to the liquid via the hopper while stirring continues. Stirring is continued for a further 20 minutes under vacuum to ensure that the magnesium powder is coated with liquid and that air and water are expelled. The remaining solid constituents are then slowly added, as required, in the following order: oxalates, potassium perchlorate, boron, approximately two-thirds of all the nitrates required, and finally the remaining third of the nitrates pre-mixed with the rubber-forming agents. It is difficult to ensure adequate dispersion of the rubber forming agents throughout the mass if they are added separately. The contents of the pot are finally stirred for about 30 minutes under vacuum.

As an alternative, the solid constituents, with the exception of the magnesium, may be blended together in a powder blender and added to the mixer in this premixed state. The addition of a small amount (2½%) of a solid surface active agent such as magnesium stearate aids the powder blending.

Although a somewhat lower temperature may be used, the process is conveniently worked at about 100° C. and dehydration of all the ingredients is ensured. The conversion of the liquid polymer to a rubber involves the liberation of a small amount of water, and probably most of this is removed during the period of vacuum mixing after the addition of rubber-forming agents.

After the mixing process most compositions can be extruded, either by press or screw extruder and fitted into the required containers. The compositions are of course only partially converted to a rubber during the final mixing and require to be fully cured by heating at 70° C. for 18 to 24 hours. It is not necessary to cure the stiffer compositions in a case since curing takes place without dimensional changes.

It is important to ensure that air is not re-incorporated into the composition during its transfer to a container. This may be done by extruding the composition into a vacuum chamber and thence into a compression screw which produces a completely de-aerated consolidated product.

I claim:
1. The process of producing a plastic pyrotechnic composition made up of a polysulphide liquid polymer, a rubber-forming agent, a light-producing metal powder, an inorganic oxidising agent and a colouring agent which comprises the steps of:
   (a) mixing said light-producing powder with said liquid polymer in a sealed mixer heated to 100° C. under a very low pressure,
   (b) stirring the mixture until adequate wetting is obtained,
   (c) mixing in two-thirds of the oxidising and colouring agents,
   (d) stirring the mixture until adequate wetting is again obtained,
   (e) mixing in the remainder of the oxidising and colouring agents premixed with said rubber-forming agent,
   (f) stirring until mixing is complete.
2. The process of producing a plastic pyrotechnic composition made of a polysulphide liquid polymer, lead peroxide, powdered magnesium, an inorganic oxidising agent, and a colouring agent which comprises the steps of:
   (a) mixing said magnesium with said liquid polymer in a sealed mixer heated to 100° C. under a very low pressure,
   (b) stirring the mixture until adequate wetting is obtained,
   (c) mixing in two-thirds of the oxidising and colouring agents,
   (d) stirring the mixture until adequate wetting is again obtained,
   (e) mixing in the remainder of the oxidising and colouring agents premixed with said lead peroxide,
   (f) stirring until mixing is complete.
3. The process of producing a plastic pyrotechnic composition made up of a polysulphide liquid polymer, a rubber-forming agent, a light-producing metal powder, an oxidising agent and a colouring agent which comprises the steps of:
   (a) mixing said light-producing metal powder with said liquid polymer in a sealed mixer heated to 100° C. under a very low pressure,
   (b) stirring the mixture until adequate wetting is obtained,
   (c) mixing in a pre-blended mixture of said oxidising agent, said colouring agent and rubber-forming agent,
   (d) stirring until the mixing is complete.
4. The process of producing a plastic pyrotechnic composition made up of a polysulphide liquid polymer, lead peroxide, powdered magnesium, an inorganic oxidising agent, and a colouring agent which comprises the steps of:
   (a) mixing said magnesium with said liquid polymer in a sealed mixer heated to 100° C. under a very low pressure,
   (b) stirring the mixture until adequate wetting is obtained,
   (c) mixing in a pre-blended mixture of said oxidising agent, said colouring agent and said lead peroxide,
   (d) stirring until the mixing is complete.
5. The product produced by the process of claim 1.

References Cited

UNITED STATES PATENTS

| | | | |
|---|---|---|---|
| 1,975,099 | 10/1934 | Graff | 149—40 |
| 1,975,785 | 10/1934 | Graff | 149—40 |
| 2,700,603 | 1/1955 | Hart et al. | 149—41 |
| 2,997,376 | 8/1961 | Bartley | 149—61 |
| 3,030,243 | 4/1962 | Hart | 149—42 |
| 3,046,168 | 7/1962 | Burkardt et al. | 149—42 |
| 3,140,207 | 7/1964 | Williams et al. | 149—40 |
| 3,223,563 | 12/1965 | Atteberry et al. | 149—19 |
| 3,257,801 | 6/1966 | Martinez et al. | 149—37 |

CARL D. QUARFORTH, Primary Examiner

S. J. LECHERT, Jr., Assistant Examiner

U.S. Cl. X.R.

149—19, 20, 22, 30, 41, 70, 71, 85